United States Patent [19]

Kelly

[11] Patent Number: 5,619,689
[45] Date of Patent: Apr. 8, 1997

[54] METHOD AND APPARATUS FOR CONFIRMING DELIVERY OF FILES IN A FILE BROADCAST SYSTEM WITH REBROADCAST TIMING AT THE RECEIVER

[75] Inventor: Frank M. Kelly, Frederick, Md.

[73] Assignee: Hughes Electronics, Los Angeles, Calif.

[21] Appl. No.: 138,940

[22] Filed: Oct. 19, 1993

[51] Int. Cl.$^6$ ................................................ G06F 17/30
[52] U.S. Cl. .................................. 395/617; 364/DIG. 1; 364/282.4; 364/284.3
[58] Field of Search ............................................. 395/600

[56] References Cited

U.S. PATENT DOCUMENTS

| | | | |
|---|---|---|---|
| 5,036,518 | 7/1991 | Tseung | 371/13 |
| 5,130,983 | 7/1992 | Heffner, III | 370/85.8 |
| 5,222,061 | 6/1993 | Doshi et al. | 370/13 |
| 5,297,143 | 3/1994 | Fridrich et al. | 370/85.3 |

OTHER PUBLICATIONS

A High Performance Braodcast File Transfer Protocol J.S.J. Daka and G.A. Waters 8282 Computer Communication Review, SIGCOMM'88 sYMPOSIUM 18 (1988) Aug., No., 4, New York, NY, USA.

A Transport Protocol Supporting Multicast File Transfer Over satellite links Eva Henriksen (FORUT-IT), Gisle Aas (NCC and Jan B. Rydningen (Spacetec a.s.), IPCCC '92.

Protocol design for large group multicasting: the message distribution protocol Mark G.W. Jones, Soren-Aksel Sorensen and Steve Rl Wilbur 8260 Computer Communications 14(1991)Jun., No. 5, London, GB.

Primary Examiner—Wayne Amsbury
Attorney, Agent, or Firm—John T. Whelan; Wanda K. Denson-Low

[57] ABSTRACT

A method and apparatus for confirming delivery of files from a hub server to multiple receiving sites in a file broadcast system. Confirmation is assured in a file broadcast system, even where receiving sites are linked to a hub server via a connectionless network, by requiring receiving sites to delay transmission of confirmation by an amount of time which is different for each receiving site, by having the hub server aggregate multiple confirmations into a single acknowledgment message, and by requiring each receiving site to retransmit a confirmation if an acknowledgment message is not received from the hub server within a timeout period.

19 Claims, 12 Drawing Sheets

NORMAL CONFIRMATION PROCESS

METHOD AND APPARATUS FOR CONFIRMING DELIVERY OF FILES IN A FILE BROADCAST SYSTEM WITH REBROADCAST TIMING AT THE RECEIVER

BACKGROUND OF THE INVENTION

1. Field of the Invention

The present invention generally relates to file broadcast systems and, more particularly, to a process for confirming delivery of broadcast files.

2. Description of the Prior Art

File broadcast (FB) is used to transfer files from a centralized computing platform to one or more distributed platforms, as illustrated in FIG. 1A. It can be considered an application-layer service in the Open Systems Interconnection (OSI) model. A file broadcast system transfers files from headquarter's computers 11 connected to a hub server 12 to computers 16 at branch offices through either a direct multidrop connection or a satellite network (VSAT) 14. When using a VSAT network, a file broadcast system can take advantage of the broadcast nature of satellite communications to greatly reduce the cost of transferring files that need to be sent to multiple locations. With such a network, a single broadcast of a file can be received in parallel by all sites requiring it.

The delivery of a file consists of several steps, shown in FIG. 1B. First, the headquarters computing platform 11 submits the file to be transmitted to a predefined directory on the hub server disk 12. Following the file, an envelope is transferred describing the file and the servers to receive the file. Second, hub equipment 13 serves as a conduit for transmissions from hub server 12 and broadcasts the file across a spacelink 14. This occurs once a file is made available to the hub server 12 and is required by one or more computing platforms 16. Third, file broadcast software at the receiving computing platform 16 performs requests for transmission and retransmission as necessary to receive the file. Local equipment 15 receives the transmission from spacelink 14 and serves as a conduit for further transmission to computing platform 16. Fourth, once the file is completely received, the file broadcast optionally performs post-processing, places the file into the addressed directory, and executes a command script if it is present.

However, under the prior art there is no central reporting of which sims received a file which is broadcast. This is due to a lack of a solution to reporting confirmations where some sites are linked to the central broadcast facility by a connectionless network. While a receiving site may request retransmission if a file does not load properly, in a connectionless network there may not be high level protocols available for confirming delivery.

SUMMARY OF THE INVENTION

The present invention provides confirmation of delivery of files in a system for broadcasting files to a connectionless network. This ensures that confirmations sent by multiple receiving sites do not reach the hub server at the same time.

The present invention reduces system bandwidth and resources required for the hub server and the receiving sites to process acknowledgments.

The present invention provides a mechanism for insuring that receiving sites receive acknowledgment from the hub server.

File delivery confirmation according to the invention is a system process and software which ensures that a file (or any other artifact) sent from a single computer to many other computers is received by all sites registered to receive the file. This process, unlike previous methods, minimizes the use of bandwidth by only sending data required to actually perform the confirmation while also ensuring that all sites receive the data. The sites that are to receive the file can respond even if they are on a connectionless network, which alleviates the requirement for a high level protocol between two sites where one is not available.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 3:
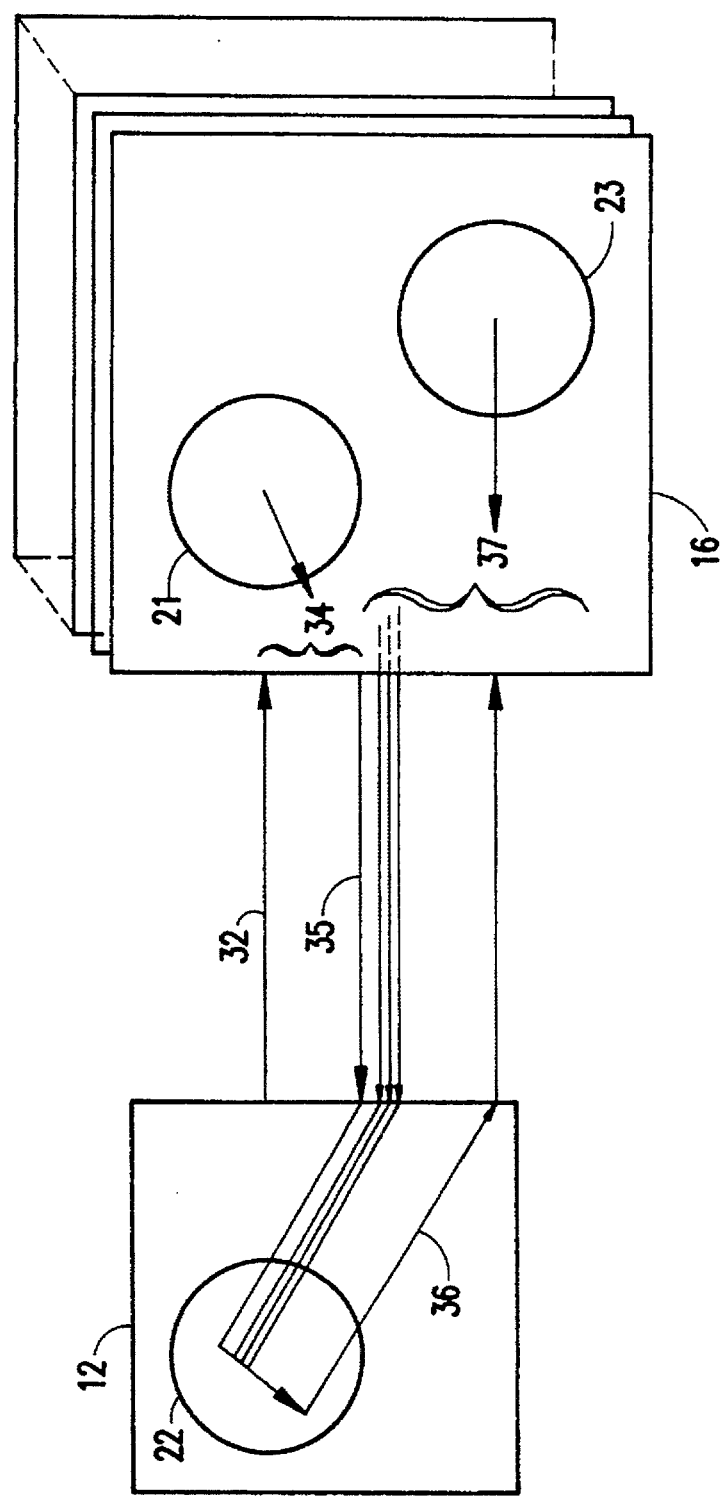
FIG. 3 is a schematic diagram showing how the present invention enhances the prior art.

Referring now to the drawings, and more particularly to FIG. 3, there is shown in schematic form the elements of a preferred embodiment of the invention. At the receiving site 16 there is a mechanism 21 for creating a backoff delay 34, either pseudo-randomly from information at the receiving site 16 or from information supplied by the hub server 12. At the hub server 12 there is a mechanism 22 for packing acknowledgments 36 so as to conserve bandwidth and processing resources when there are large numbers of receiving sites 16. Finally, there is a mechanism 23 at the receiving site 16 for determining that a confirmation 35 is to be retransmitted if an acknowledgment 36 is not received from the hub server within a timeout period 37.

Figure 1A:
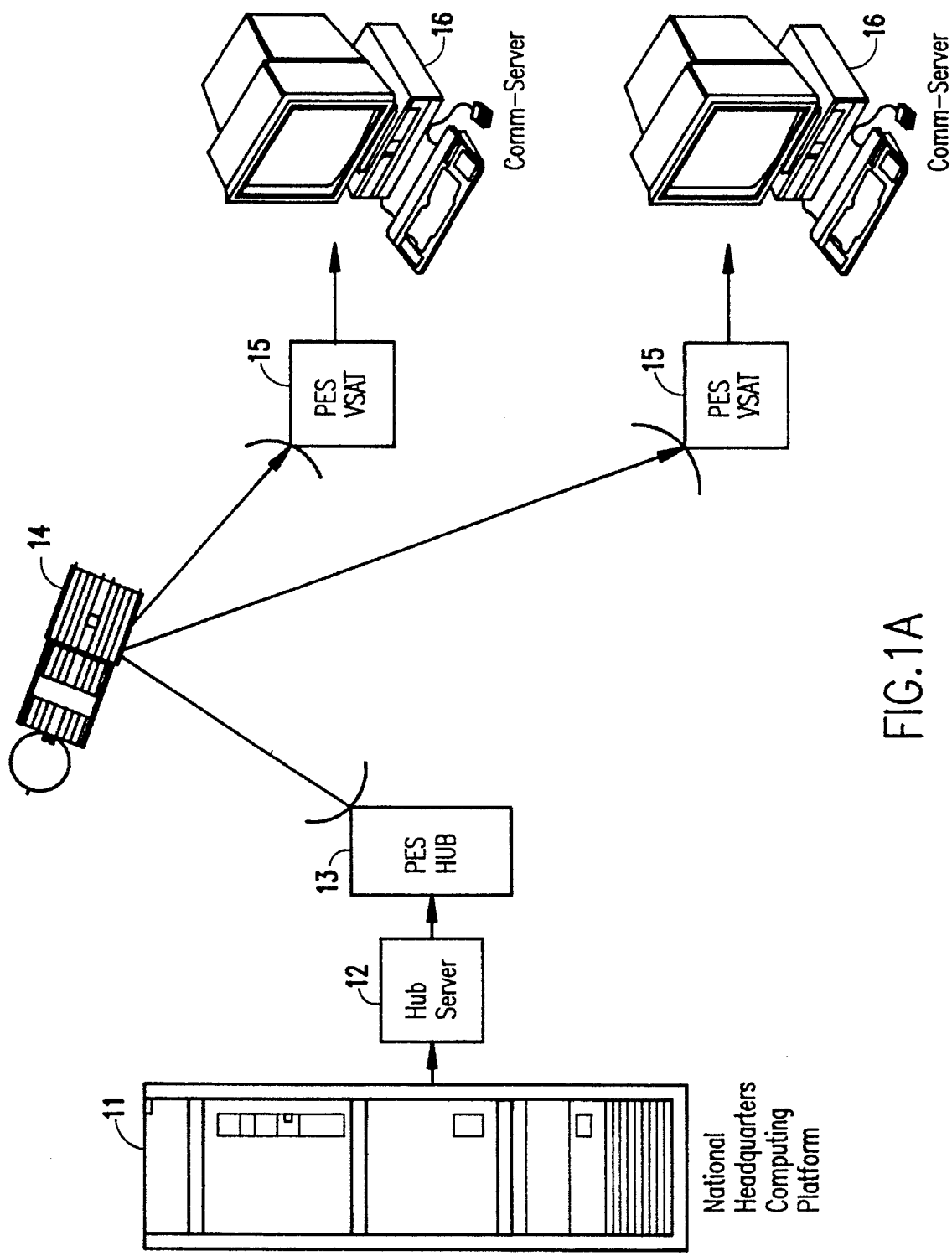
FIGS. 1A and 1B are schematic diagrams illustrating the components and operation of conventional file broadcast systems.
Figure 1B:
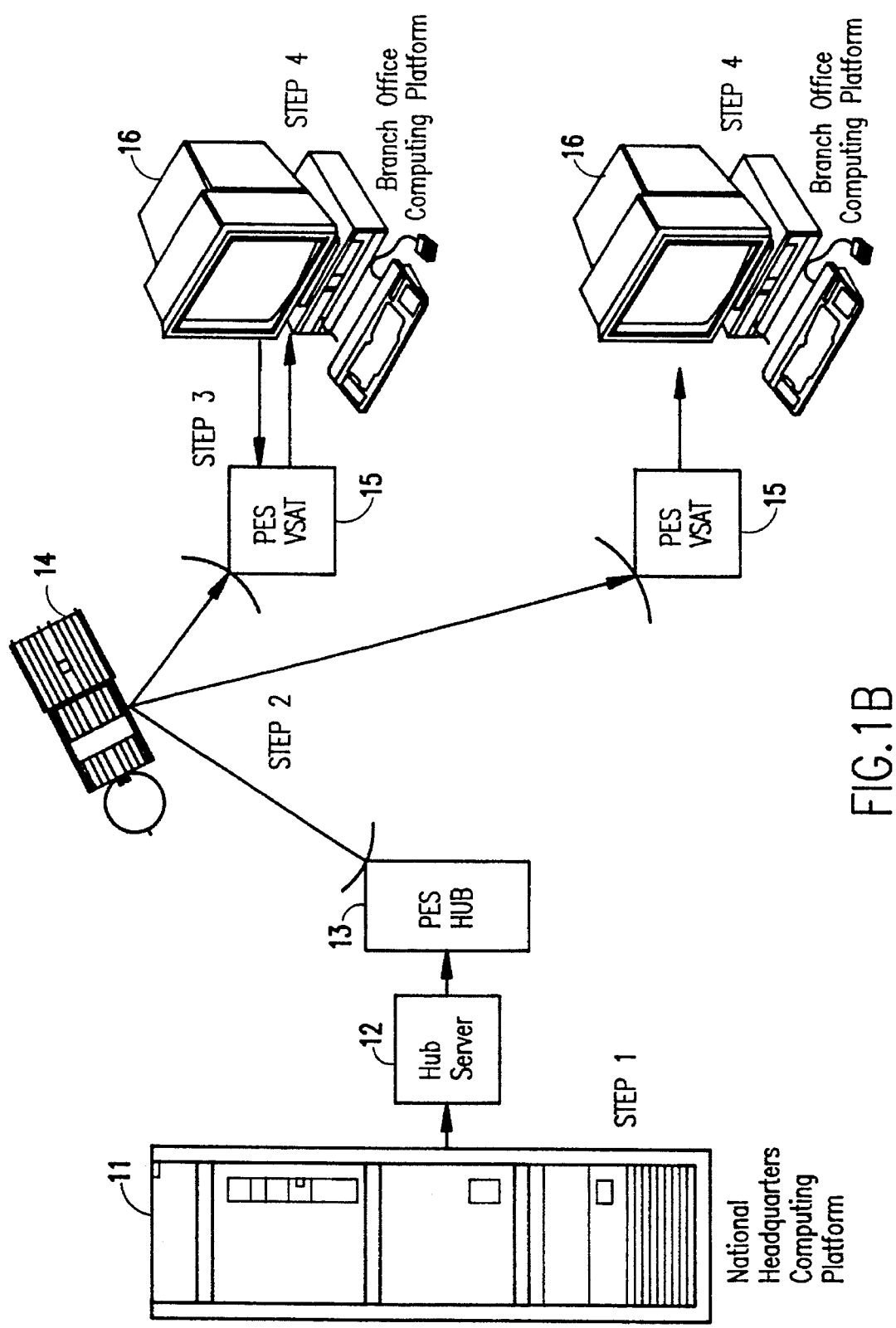
Figure 2A:
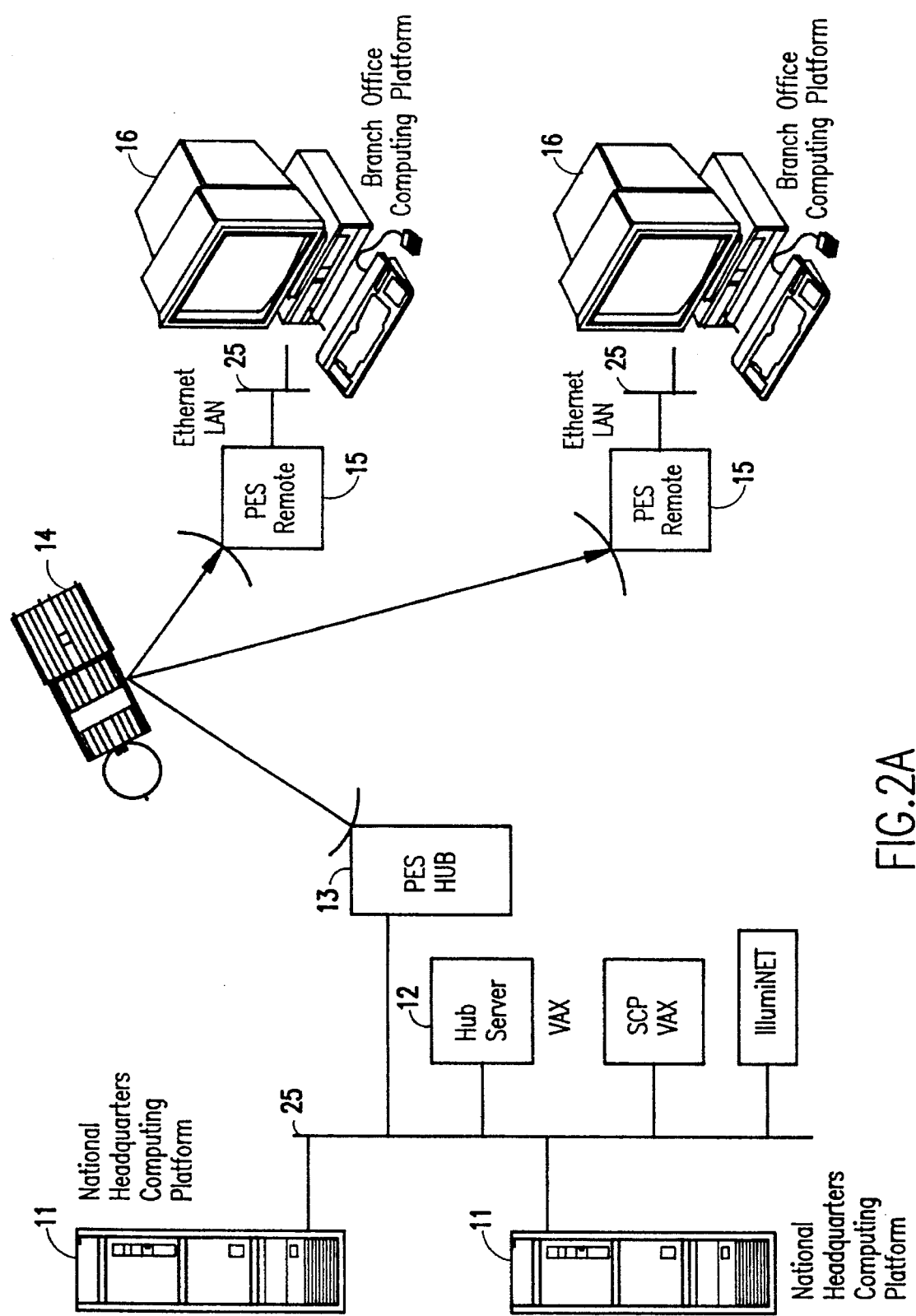
FIGS. 2A, 2B, 2C and 2D show alternative implementations of file broadcast systems, as practiced under the present invention, to serve a variety of configurations at distributed sites.
Figure 2B:
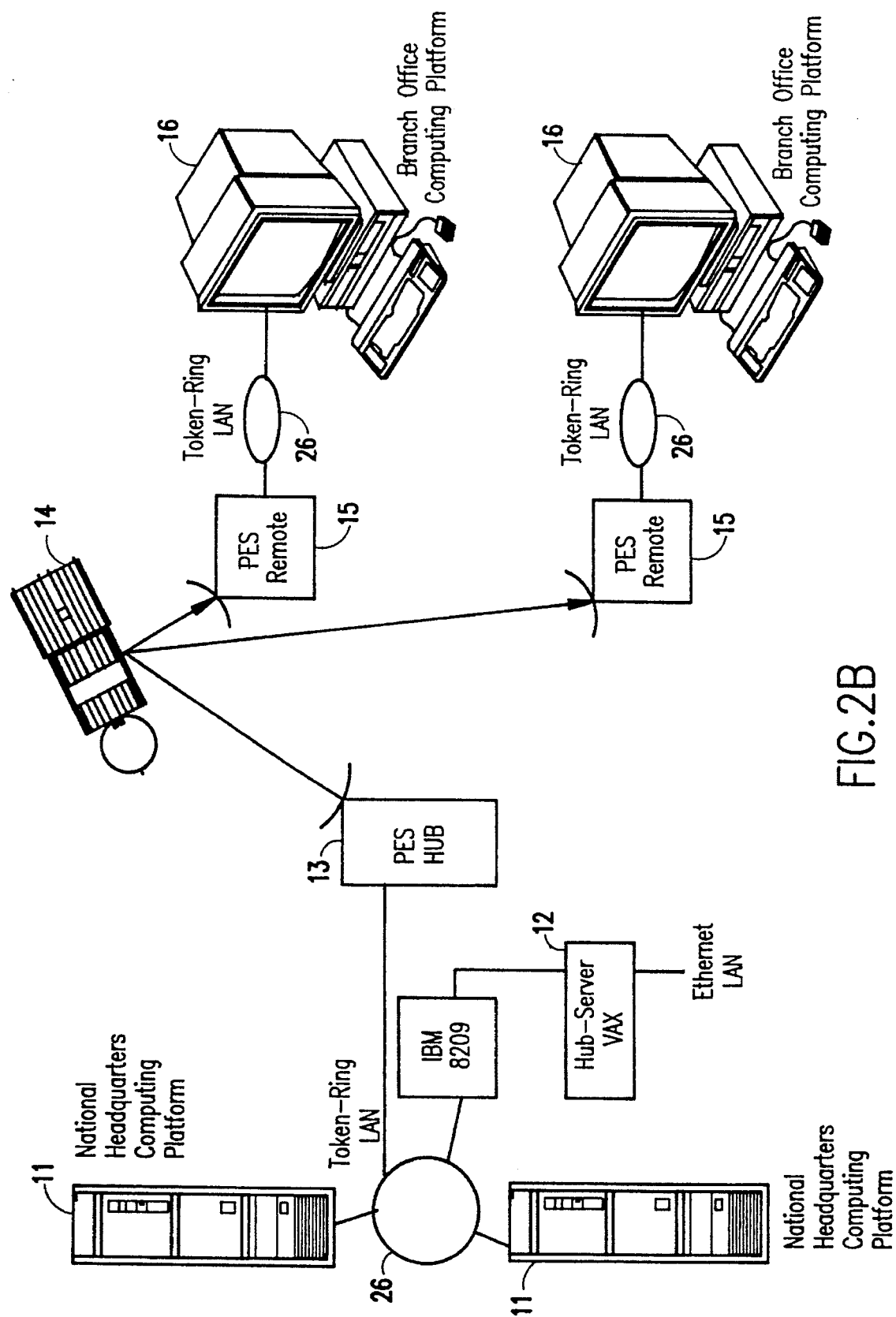
Figure 2C:
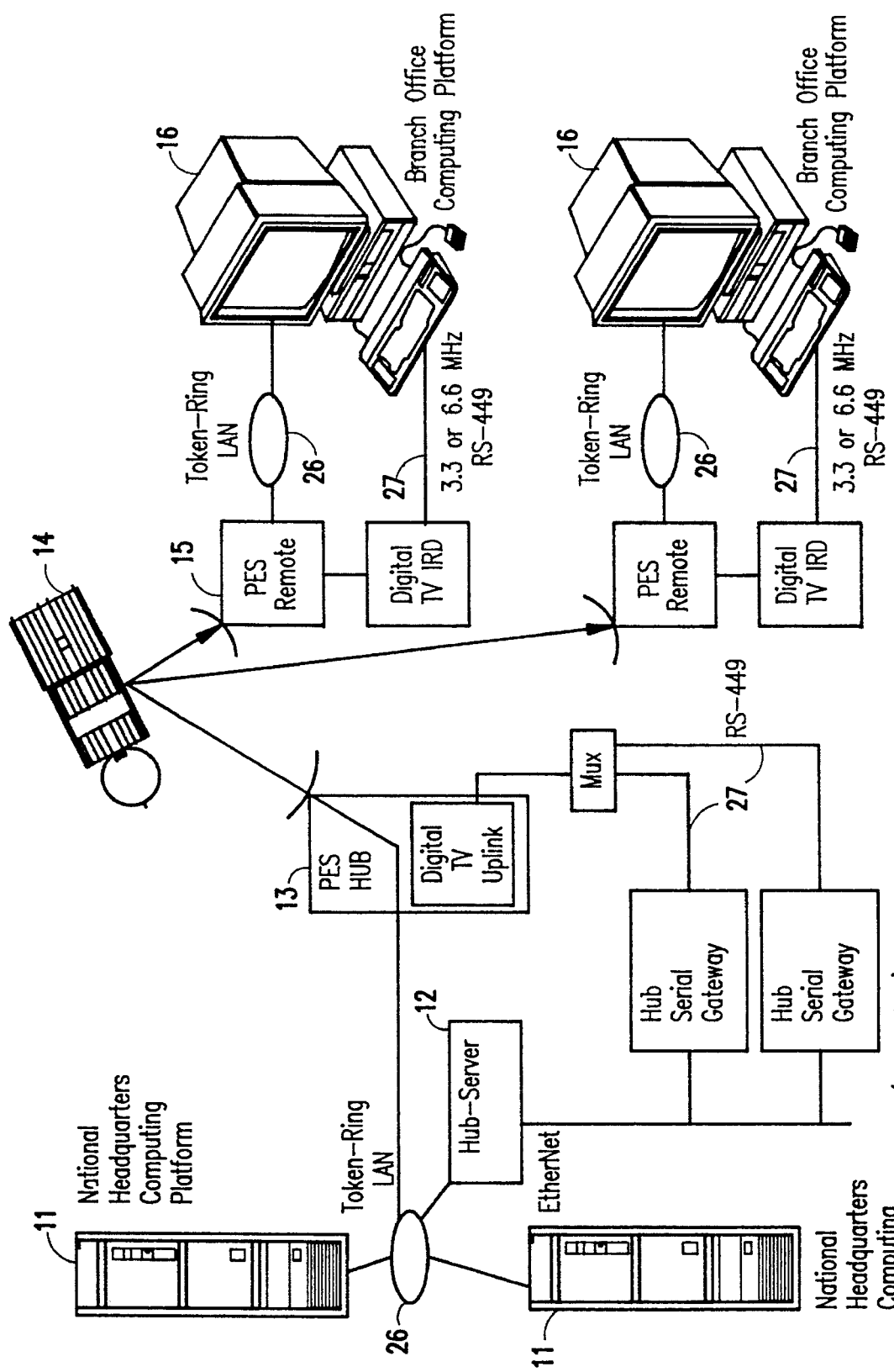
Figure 2D:
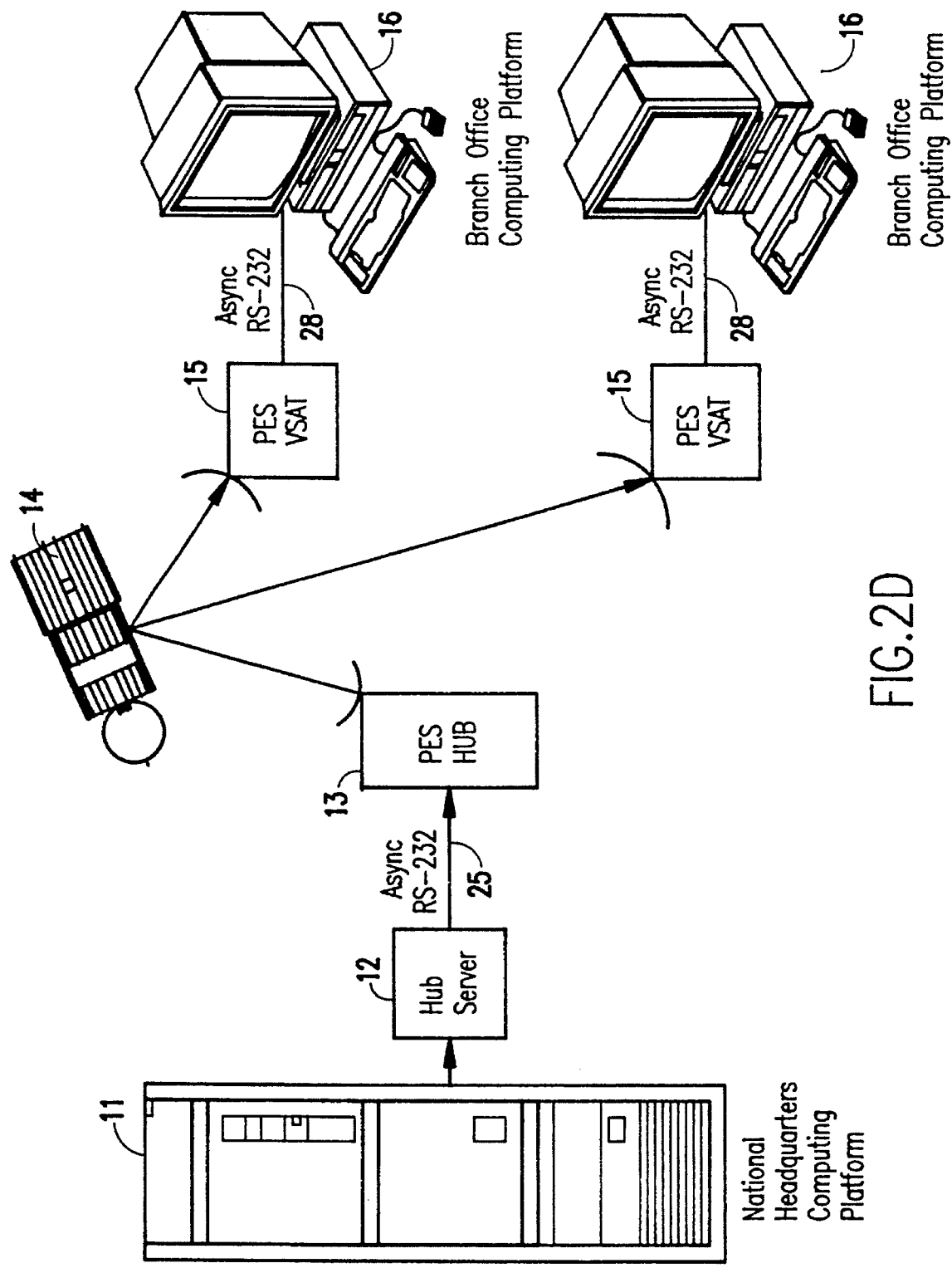
Figure 2E:
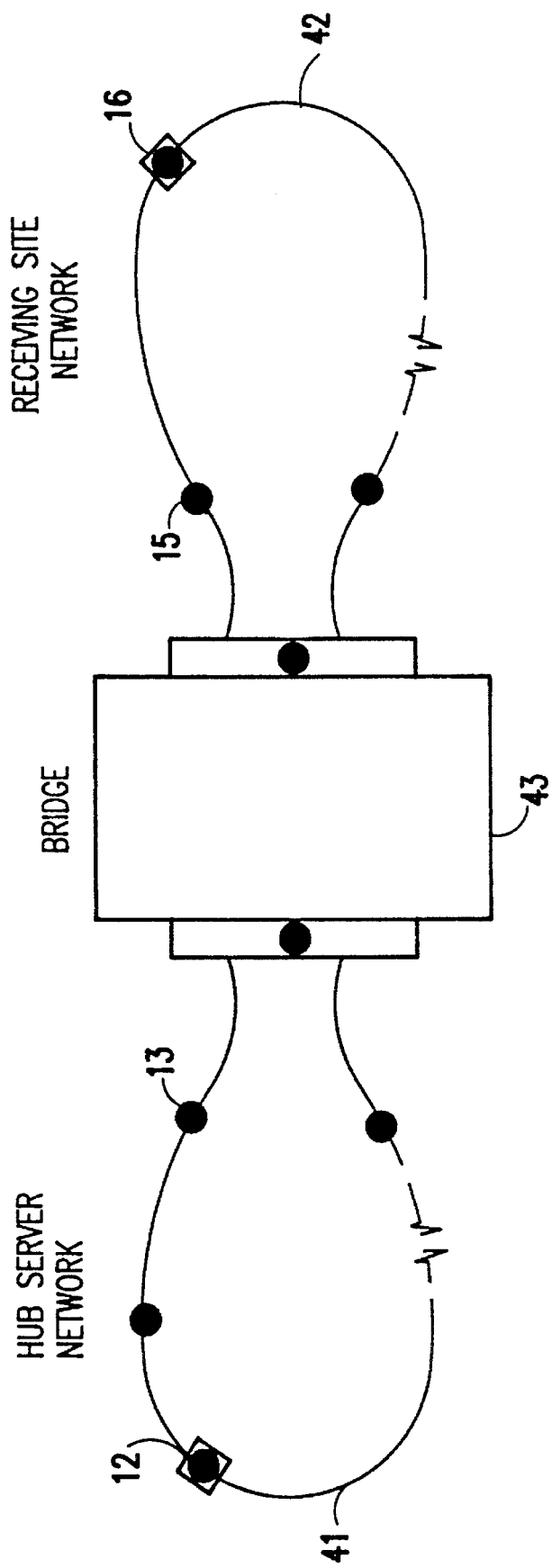
FIG. 2E is a schematic representation of a LAN bridging model used in the implementations shown in FIGS. 2A, 2B, 2C and 2D.

FIGS. 2A through 2D show alternative implementations of file broadcast systems, as practiced under the present invention, to serve a variety of configurations at distributed locations. FIG. 2A shows an implementation where the linkage between local equipment 15 and computing platform 16 is an Ethernet LAN 25. In FIG. 2B the linkage is a Token Ring LAN 26. FIG. 2C shows an implementation which includes transmission and reception of digitized video files over an RS-449 link 27. FIG. 2D shows an implementation where the receiving site 16 is connected to local equipment 15 via an asynchronous RS-232 linkage 28. As shown in FIG. 2E, in all these implementations the communications model is a LAN bridge 43, between the network 41 controlled by hub server 12 and the network 42 at receiving sites 16, where appropriate frame relay multiplexing and bridge functionality is built into the software at hub server 12. Hub server network 41 and receiving site network 42 may be Ethernet 25 as shown in FIG. 2A, or Token Ring 26 as shown in FIG. 2B, or asynchronous 28 as shown in FIG. 2D.

Figure 4A:
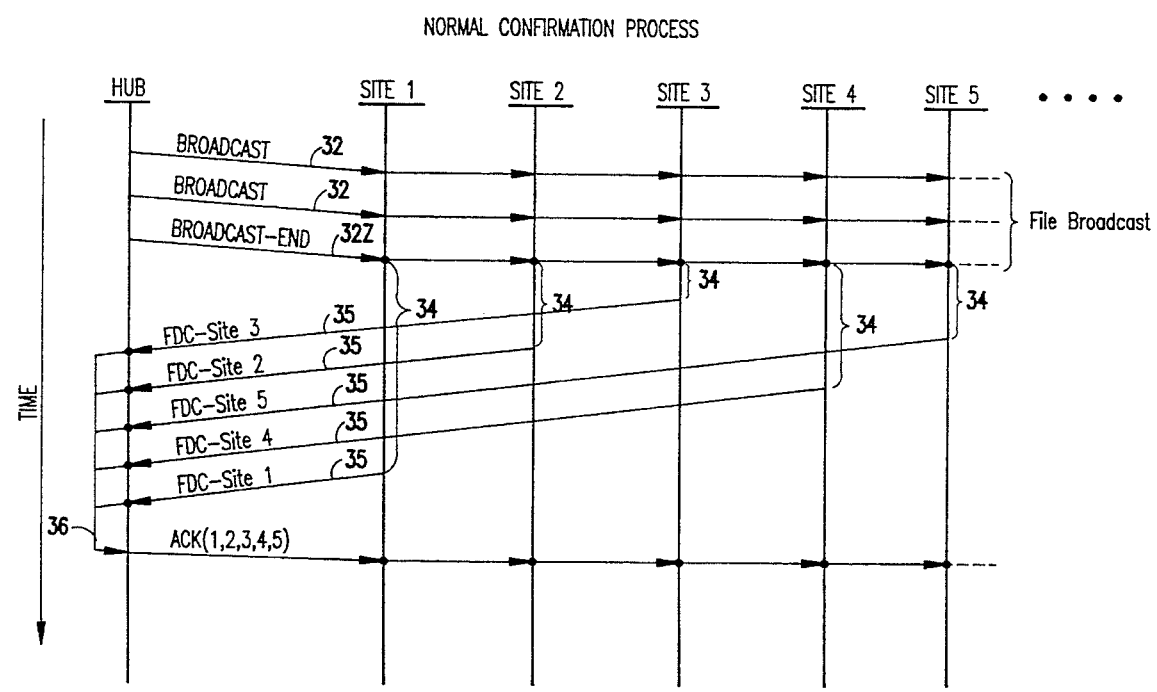
FIG. 4A is a timing and sequence diagram showing operation of the invention under normal circumstances.

FIG. 4A shows the normal confirmation process. A file 31 is broadcast from the hub 12 in one or more packets 32. Upon receipt of the final packet 32Z, each receiving site generates a backoff time delay 34 and then, after passage of the backoff time delay 34, transmits a file delivery confirmation (FDC) 35 back to the hub 12. The hub 12 receives file delivery confirmations 35 from receiving sites 16, and periodically transmits to the network an acknowledgment list 36 of all receiving sites whose file delivery confirmations 35 have been received by the hub 12.

The purpose of backoff delay 34 is to avoid collisions at the hub 12 of file delivery confirmations 35. Since the hub 12 broadcasts to all receiving sites 16 simultaneously, receiving sites 16 will often receive broadcast files at nearly the same time. If each receiving site 16 transmitted a file delivery confirmation 35 without delay, these confirmations would reach the hub 12 at nearly the same time and make it difficult for the hub to separate one confirmation from another. This difficulty is overcome by a mechanism 21 which provides each receiving site with a different backoff delay time period 34 for delaying transmission of file delivery confirmations.

The best mode for determining the backoff delay 34 is to use the pseudo-random timestamp on the machine 16 at the receiving site, together with an identifier for the receiving site. When ready to transmit a packet, the site will choose a pseudo-random time between the current time and a time offset configured into the hub server 12 or the machine 16 at the receiving site at install time. This offset can be modified as network requirements change. The site will then attempt to transmit the data when the pseudo-random timer expires.

This offset may be zero if each site has a dedicated line back to the hub 12, where the term "dedicated" means that there are in place at the hub 12 buffering or other suitable means for assuring that acknowledgments which arrive along different dedicated lines from different sites at the same time will not be lost. However, this option does not apply for connectionless networks. If either the inbound channel is shared or the hub server 12 is able to receive a limited number of acknowledgments at one time, the backoff delay 34 is configured so that the rate of incoming acknowledgments will not exceed the bandwidth of the inbound channel and the hub server 12 can handle the rate of incoming acknowledgments.

The backoff delay 34 could also be determined by the known throughput of the inbound link factored with the number of sites on the network. The inbound link may be a dialup line, a LAN interconnection or any data interchange physical interface. The backoff delay 34 can be tuned to reflect the throughput that is optimal for the particular inbound link. The backoff delay 34 could also be calculated using simpler methods such as the timestamp alone or according to the data in a previously received packet.

In order to save bandwidth used by the hub in broadcasting to receiving sites, the hub uses a procedure for packing acknowledgments: it builds up single acknowledgments reflecting receipt of multiple file delivery confirmations 35. This procedure also saves on the computing resources required by the hub 12 and the receiving sites 16 to process acknowledgment frames 36. The number of file delivery confirmations 35 reflected in a single acknowledgment frame 36 can be varied according to the number of files transmitted multiplied by the number of sites, or simply the number of sites. This number can also be set to "1" to disable the packing of acknowledgements.

Figure 4B:
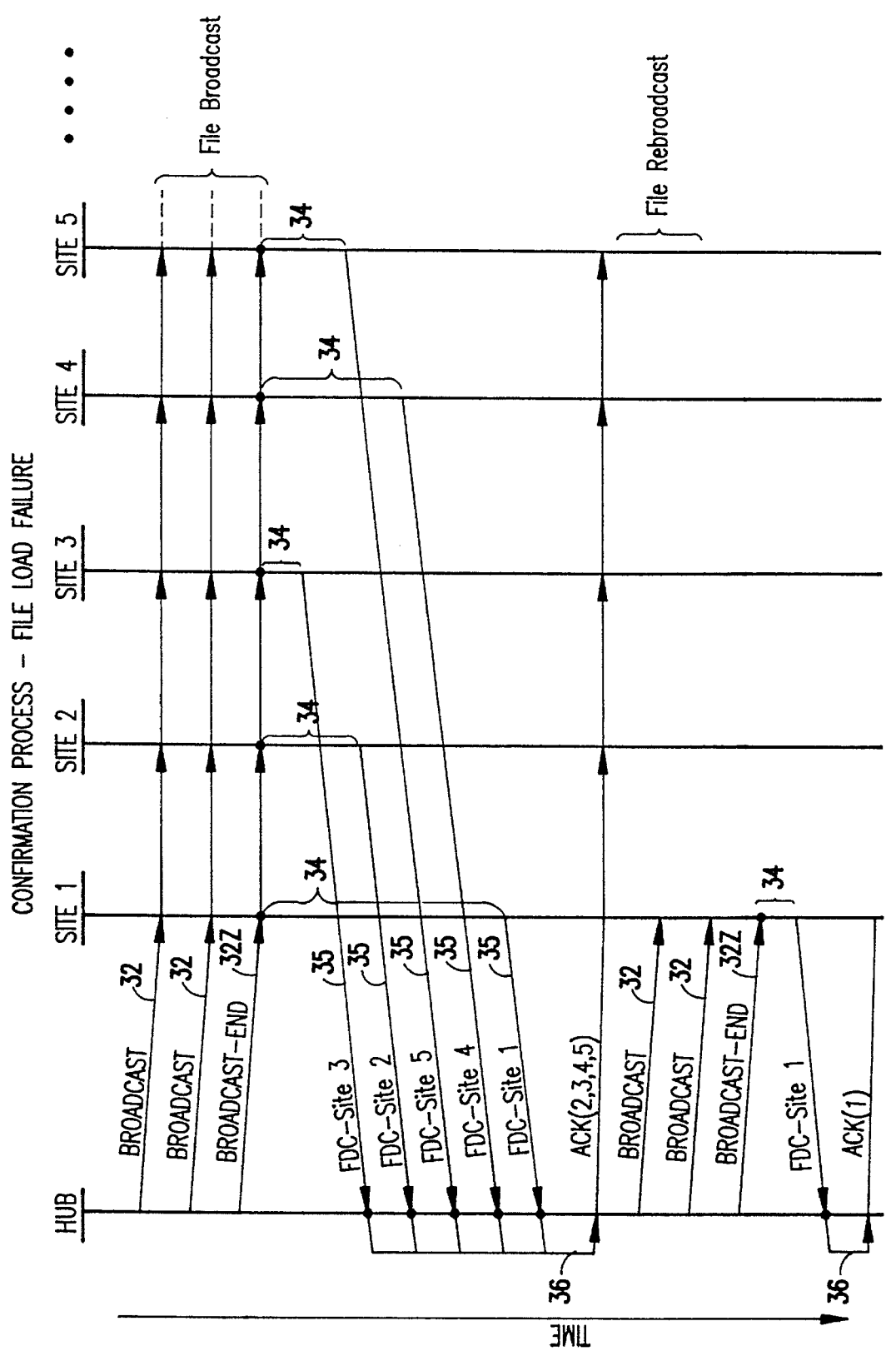
FIG. 4B is a timing and sequence diagram showing operation of the invention where there has been a failure of file loading at a receiving site.
Figure 4C:
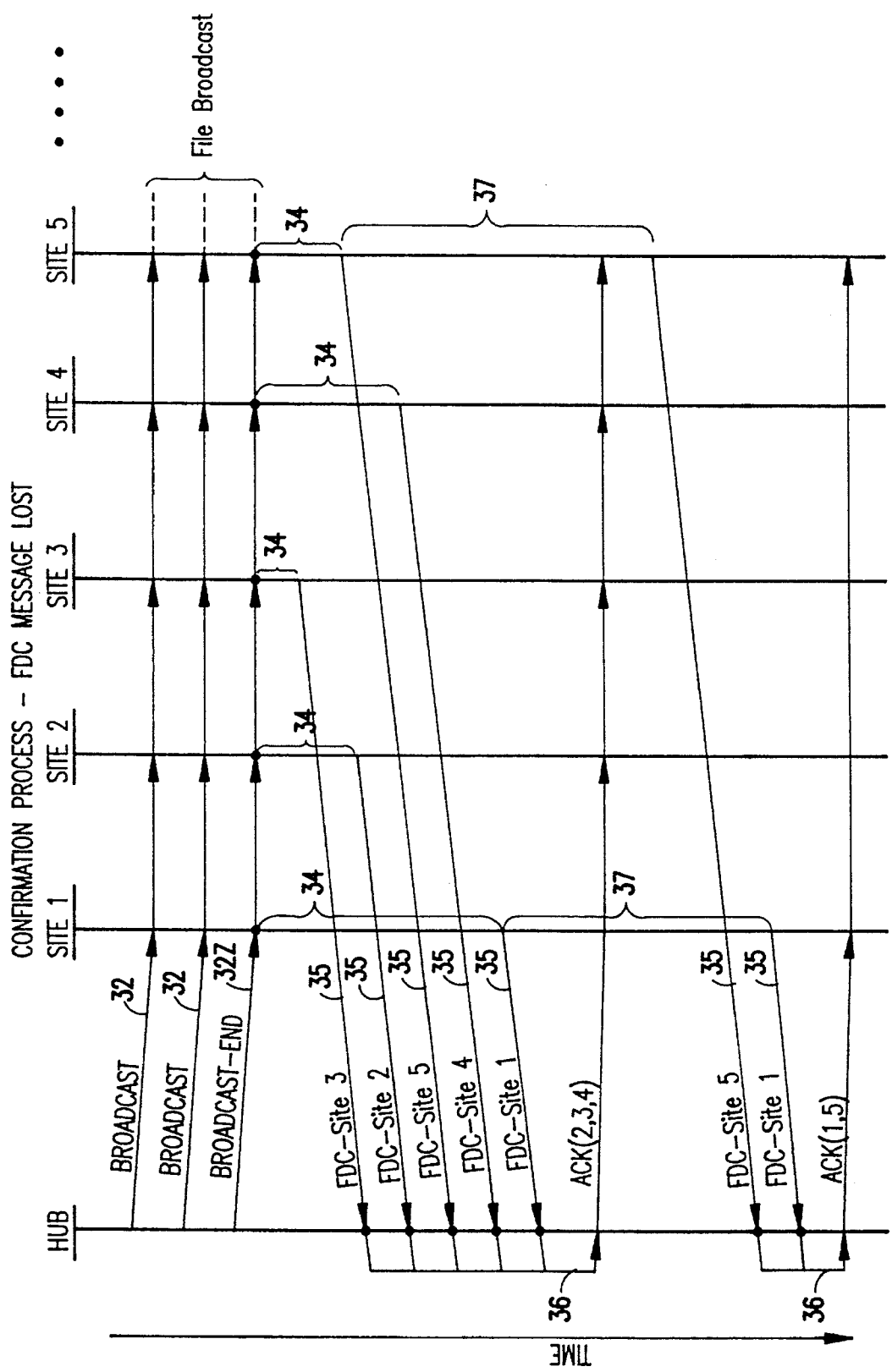
FIG. 4C is a timing and sequence diagram showing operation of the invention where file delivery confirmations from one or more receiving sites are lost.
Figure 4D:
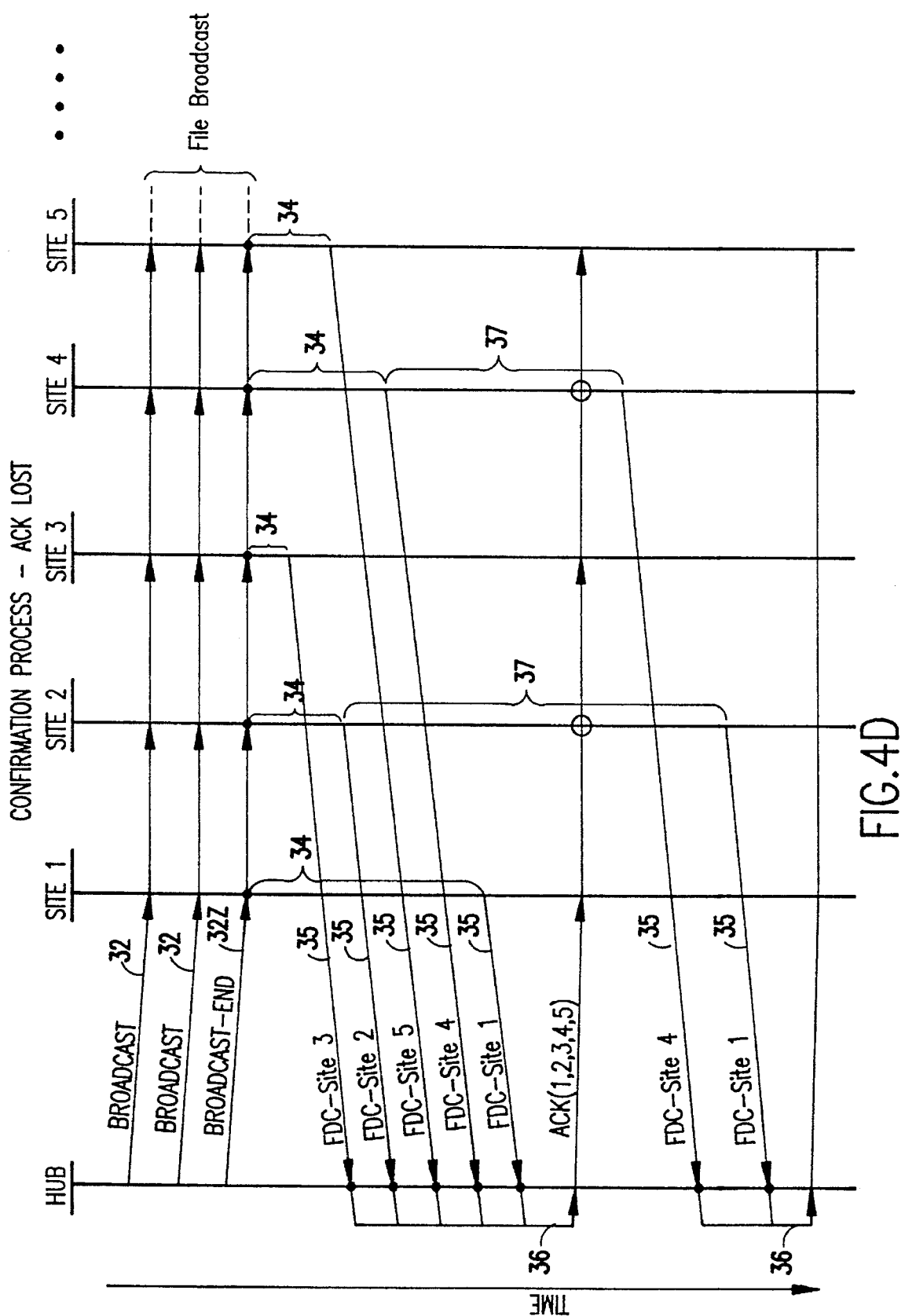
FIG. 4D is a timing and sequence diagram showing operation of the invention where acknowledgment of file delivery confirmation is lost between the hub server and one or more receiving sites.

FIGS. 4B, 4C and 4D show how the confirmation process operates under fault conditions. In FIG. 4B, there is a file load failure at one of the receiving sites (for purposes of illustration, Site 1). In consequence, Site 1 transmits a request for retransmission of the file rather than a file delivery confirmation. The acknowledgment sent out by the hub 12 is response to file delivery confirmations transmitted by the other sites does not include Site 1 in its list. The hub 12 then rebroadcasts the file 32, Site 1 receives and transmits a file delivery confirmation 35, and the hub 12 sends an acknowledgment 36.

In FIG. 4C, the file delivery confirmations sent by several of the receiving sites (for purposes of illustration, Sites 1 and 5) are lost. Consequently, the list of sites in the acknowledgement frame 36 broadcast by the hub 12 does not include Sites 1 and 5. Once a site transmits a packet it will wait for a timeout period 37 for a confirmation acknowledgment 36 from the hub server 12. If the timeout period 37 expires and no acknowledgment 36 is received, the site will then reinitiate the file delivery confirmation transmit cycle. The length of timeout period 37 is determined by the expected return time for the acknowledgment message, which may be indicated by a fixed outer limit or by information received from the hub. The fixed outer limit will be the sum of the maximum backoff delay 34, the inbound propagation delay, and the outbound propagation delay. Thus, in FIG. 4C sites 1 and 5 are shown retransmitting their file delivery confirmations 35 after the timeout period. The retransmission may include a flag to indicate that it is a retransmission. The hub will always acknowledge a confirmation, but will not re-record a confirmation previously received.

In FIG. 4D, the file delivery confirmations are received by the hub but the acknowledgment broadcast by the hub is lost and not received by several of the sites (for purposes of illustration, sites 2 and 4). After the timeout period, these sites retransmit their file delivery confirmations. After the hub receives these confirmations, the hub broadcasts an acknowledgment frame 36 listing these sites. When the receiving site receives an acknowledgment from the hub that the confirmation has been received, the cycle is complete.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. In a file broadcast system, wherein files are broadcast simultaneously from a hub server to multiple receiving sites, a method for confirming delivery of broadcast files, comprising the steps of:

transmitting by each receiving site to the hub server of a confirmation;

packing by the hub server of a multiplicity of said confirmations into a single acknowledgment containing a list of the receiving site sources of said confirmations;

broadcasting by said hub server of the packed acknowledgment; and retransmitting of the confirmation by a receiving site, if the receiving site does not receive the acknowledgment within a determined period of time measured at the receiving site.

2. A file broadcast system according to claim 1, wherein transmission of said confirmation by the receiving site is delayed by a backoff period, said backoff period being devised so that confirmations from the multiple receiving sites arrive at the hub server at different times.

3. A file broadcast system according to claim 2, wherein the backoff period is determined by the hub server and included within broadcasts to the receiving sites.

4. A file broadcast system according to claim 2, wherein the backoff period is determined by each receiving site by reference to first and second factors, the first factor being the bandwidth available for transmissions from the receiving sites to said hub server, and the second factor being the number of receiving sites.

5. A file broadcast system according to claim 2, wherein the backoff period is determined by each receiving site by reference to first and second factors, the first factor being a timestamp associated with a host computing machine at the receiving site, and the second factor being an identifier associated with the receiving site.

6. A file broadcast system according to claim 1, wherein the number of confirmations packed in the acknowledgment is determined by first and second factors, the first factor being the number of said files transmitted and the second factor being the number of receiving sites.

7. A file broadcast system according to claim 1, wherein the number of said confirmations packed in said acknowledgment is determined by the number of receiving sites.

8. A file broadcast system according to claim 7, wherein the retransmission includes a flag to indicate that it is a retransmission.

9. A file broadcast system according to claim 1, wherein the determined period of time is a fixed estimate based on the expected return time for the acknowledgment.

10. A file broadcast system according to claim, 1, wherein the determined period of time is established by the hub server and broadcast to the receiving sites.

11. In a file broadcast system, wherein files are broadcast simultaneously from a hub server to multiple receiving sites, an apparatus for confirming delivery of broadcast files, comprising:

a transmitter at each receiving site which transmits to the hub server a confirmation, transmission of a confirmation being delayed by a backoff period, the backoff period being devised so that confirmations from the multiple receiving sites arrive at said hub server at different times;

a processor at the hub server for packing a multiplicity of confirmations into a single acknowledgment, the acknowledgment containing a list of the receiving site sources of confirmations received; and a broadcast transmitter at the hub server for transmitting the packed acknowledgment to the multiple receiving sites;

said transmitter at a receiving site retransmitting the confirmation of the receiving site, if the receiving site does not receive the acknowledgment from the hub server within a determined period of time measured at the receiving site.

12. A file broadcast system according to claim 11, wherein the backoff period is determined by the receiving site by reference to first and second factors, the first factor being a timestamp associated with a host computing machine at the receiving site, and the second factor being an identifier associated with the receiving site.

13. A file broadcast system according to claim 11, wherein the backoff period is determined by the hub server and included within broadcasts to the receiving sites.

14. A file broadcast system according to claim 11, wherein the backoff period is determined by the receiving site by reference to first and second factors, the first factor being the bandwidth available for transmissions from the receiving sites to the hub server, and the second factor being the number of receiving sites.

15. A file broadcast system according to claim 11, wherein the number of confirmations packed in an acknowledgment is determined by first and second factors, the first factor being the number of files transmitted and the second factor being the number of receiving sites.

16. A file broadcast system according to claim 11, wherein the number of confirmations packed in an acknowledgment is determined by the number of receiving sites.

17. A file broadcast system according to claim 11, wherein the determined period of time is a fixed estimate based on the expected return time for an acknowledgment.

18. A file broadcast system according to claim 17, wherein the retransmission includes a flag to indicate that it is a retransmission.

19. A file broadcast system according to claim 11, wherein the determined period of time is established by the hub server and broadcast to the receiving sites.

\* \* \* \* \*

UNITED STATES PATENT AND TRADEMARK OFFICE
CERTIFICATE OF CORRECTION

PATENT NO. : 5,619,689
DATED : April 8, 1997
INVENTOR(S) : Frank M. Kelly, et. al.

It is certified that error appears in the above-indentified patent and that said Letters Patent is hereby corrected as shown below:

Title page, item [75] inventor: should read--Frank M. Kelly and Bill Stanton--.

Signed and Sealed this

Twenty-ninth Day of July, 1997

Attest:

BRUCE LEHMAN

Attesting Officer    Commissioner of Patents and Trademarks